(12) United States Patent
Richardson

(10) Patent No.: US 6,253,639 B1
(45) Date of Patent: *Jul. 3, 2001

(54) EXTENSIBLE CRANK

(76) Inventor: Ronald Hugh Richardson, 7325 Chemin du Huard Mont Rolland, Quebec (CA), J0R 1G0

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,564

(22) Filed: Nov. 19, 1997

Related U.S. Application Data
(60) Provisional application No. 60/031,351, filed on Nov. 22, 1996.

(51) Int. Cl.$^7$ ............................. B62M 1/02; B62M 3/04
(52) U.S. Cl. ................................................. 74/594.3
(58) Field of Search .......................... 74/594.3, 594.1, 74/594.2

(56) References Cited

U.S. PATENT DOCUMENTS

| | | | | |
|---|---|---|---|---|
| 563,821 | * | 7/1896 | Unruh | 74/594.3 |
| 589,728 | * | 9/1897 | James | 74/594.3 |

FOREIGN PATENT DOCUMENTS

| | | | | |
|---|---|---|---|---|
| 3425342 | * | 1/1986 | (DE) | 74/594.3 |
| 2603862 | * | 3/1988 | (FR) | 74/594.3 |
| 2720 | * | 12/1896 | (GB) | 74/594.3 |
| 631997 | * | 11/1949 | (GB) | 74/594.3 |
| 472347 | * | 6/1952 | (IT) | 74/594.3 |

* cited by examiner

Primary Examiner—Mary Ann Green

(57) ABSTRACT

An apparatus for translating a radial force applied to a crank into additional rotary motion by a crankshaft is described as including a crank mechanically coupled to the crankshaft that is adapted to extend away from the crankshaft and also toward the crankshaft. A spring is used to apply a biasing force to urge the crank toward the crankshaft. According to a first described embodiment, extension of the crank from the crankshaft acts upon flexible chain attached to the crank and to a cam so that extension of the crank causes additional rotation of the cam. The cam is attached to the crankshaft so that the extension of the crank also causes additional rotation by the crankshaft. According to a second embodiment, a pedal carrier arm is disposed at an angle intermediate a pair of members which define a primary crank and is held adjacent to each of a pair of rollers that are attached to the primary crank. Extension by the pedal carrier arm forces one of the pair of rollers to displace the primary crank an additional amount. Extension of the pedal carrier arm results in additional rotation by the crankshaft, thus translating radial motion by the pedal carrier arm into additional rotary motion of the crankshaft.

20 Claims, 5 Drawing Sheets

EXTENSIBLE CRANK

RELATED APPLICATION

This application claims the benefit of U.S. Provisional Application No. 60/031,351, filed Nov. 22, 1996.

BACKGROUND OF THE INVENTION

1. Field of the Invention

The present invention, in general relates to cranks and, more particularly, to bicycle cranks that extend and retract during usage.

Pedal cranks that are powered by a human, such as the pedal crank of a bicycle, are well known. It is also known that the direction of the force applied to such a crank is fairly consistent. Normally an upright operator applies a downward force to the pedals. Depending upon the skill of the operator the magnitude of the force varies according to the position of the pedal in the stroke cycle. For example when the pedal is in the middle of the downward stroke, a skilled operator is applying maximum force to that pedal and when the pedal is in the upward stroke, the skilled operator would be applying a minimum amount of force to the pedal so as not to impede the direction of rotation of the crankshaft to which the pedals and cranks are attached.

Sometimes an accessory known as a toe-clip is attached to each of the pedals that allows a skilled user to apply a negative, or upward, force to the pedal during the upward stroke to gain efficiency. However, the bulk of the force that is normally applied to each of the pedals of a bicycle is downwardly directed.

Regardless as to whether toe-clips are used or not, all of the force that is applied to the pedal does not serve to advance rotation of the crankshaft, as is desired. A portion of the force acts radially upon the crankshaft in a direction that attempts to either extend or retract the crank. For example when the pedal is at the bottom of its stroke any force applied in an downward direction at that time would only attempt to extend the crank further away from the operator. It does not serve to advance rotation of the crankshaft.

Various solutions have been proposed. For example elliptical chain sprockets keep the pedal engaged in a position away from vertical for a greater proportion of the pedal cycle than do conventional circular sprockets by slowing the pedal speed while in the downward stroke.

This improvement is limited by acceptable fluctuations in pedal travel speed. To exaggerate the ellipse to further the benefit derived is unacceptable because it introduces too much of a variant in the speed of the pedal at various positions throughout the stroke.

Another improvement includes an extensible crank whereby the crank length is increased during the most useful part of the stroke to provide greater torque. However, there is no advancement of the rotation of the crankshaft that occurs inherent with the extension of the crank.

Other proposed solutions suffer from complexity of design and provide only limited benefit.

Accordingly there exists today a need for an extensible crank that translates extension of the crank into additional rotation of the crankshaft in the desired direction. Such an apparatus is clearly a useful and desirable device.

2. Description of Prior Art

Pedal operated cranks are, in general, known. For example, the following patents describe various types of these devices:

U.S. Pat. No. 4,319,271 to Chattin, that issued May 28, 1985;

U.S. Pat. No. 4,793,208 to Bregnard et al, that issued Dec. 27, 1988;

U.S. Pat. No. 4,807,491 to Stuckenbrok, that issued Feb. 28, 1989;

U.S. Pat. No. 5,067,370 to Lemmens, that issued Nov. 26, 1991;

U.S. Pat. No. 5,121,654 to Fasce, that issued Jun. 16, 1992; and

U.S. Pat. No. 5,419,572 to Stiller et al, that issued May 30, 1995.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an extensible crank that increases the proportion of time spent in the power part of the cycle.

Another object of the invention is to provide an extensible crank that is adapted for use with bicycles.

Still another especially important object of the invention is to provide an extensible crank that advances the rotation of the crankshaft in the desired direction during extension of the crank.

Still yet another object of the invention is to provide an extensible crank that translates radial force applied to a pedal into rotational force applied to a crankshaft.

Yet another important object of the invention is to provide an extensible crank that translates elliptical motion into rotary motion.

Still yet another important object of the invention is to provide an extensible crank that translates eccentric elliptical motion into rotary motion.

Still yet one other important object of the invention is to provide an extensible crank that can supply rotational power to a crankshaft when the pedal is disposed away from an operator.

Briefly, an extensible crank that is constructed in accordance with the principles of the present invention has at least one crank that is connected to a crankshaft. The crank is able to extend in length in response to an outward radial force that is applied thereto. A radial extension of the crank is mechanically coupled to the crankshaft so as to advance the rotation of the crankshaft in the desired direction of rotation. A spring is used to retract the crank absent a sufficient radial force to maintain extension thereof.

DETAILED DESCRIPTION OF THE INVENTION

Figure 1:
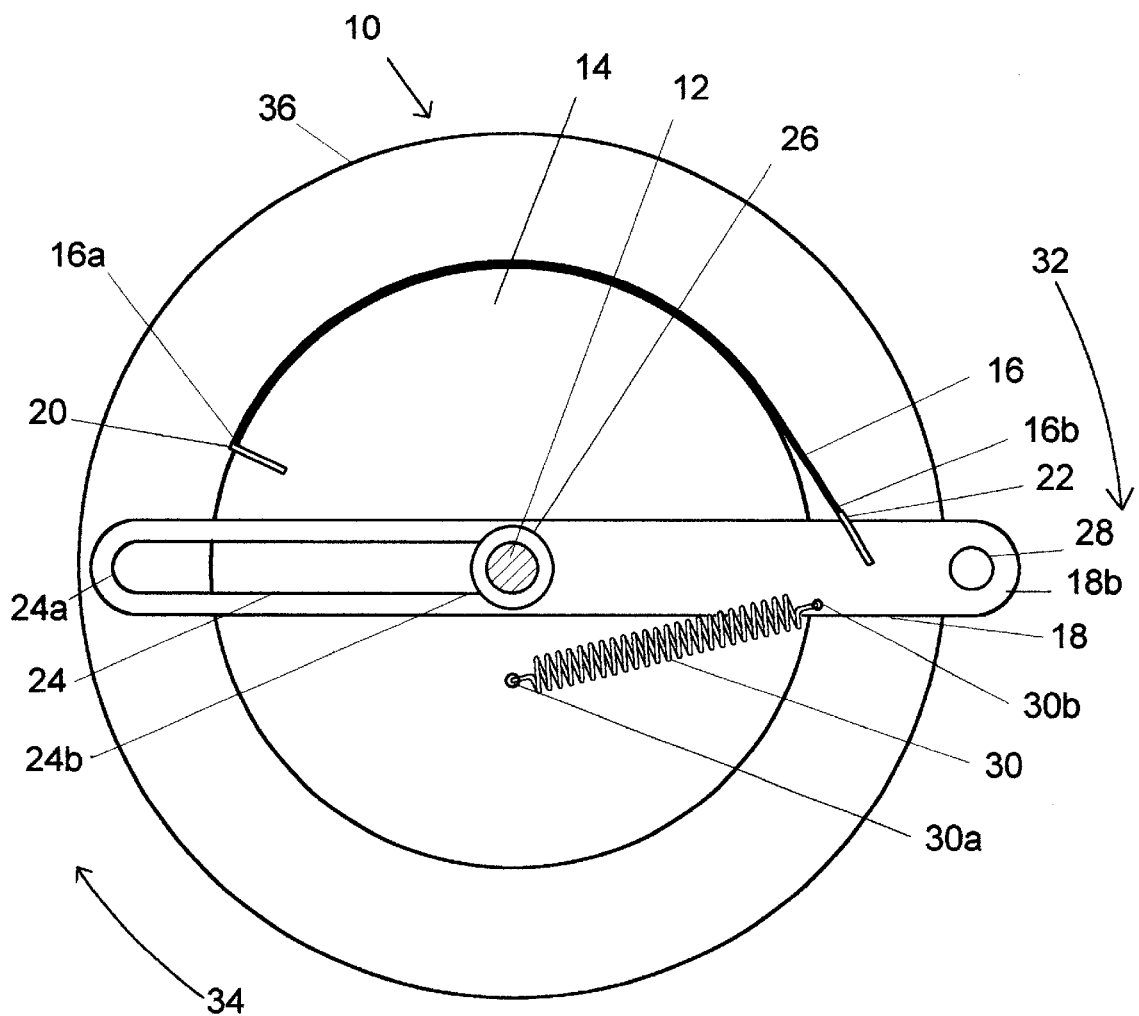
FIG. 1 is a side view of an extensible crank in a retracted position in a horizontal (parallel) position with respect to the ground plane.
Figure 2:
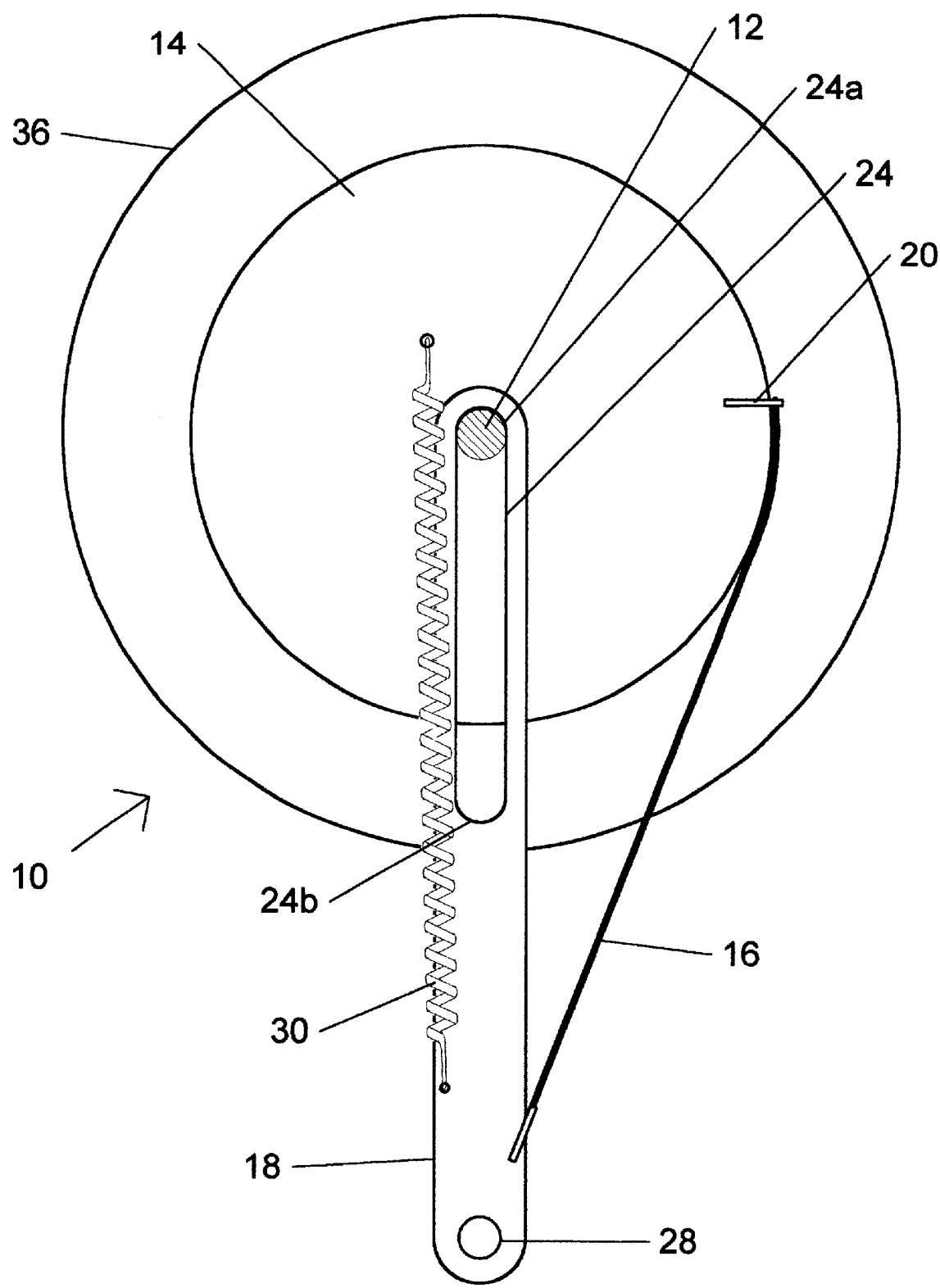
FIG. 2 is a side view of an extensible crank in an extended position in a vertical or downward (perpendicular) position with respect to the ground plane.
Figure 3:
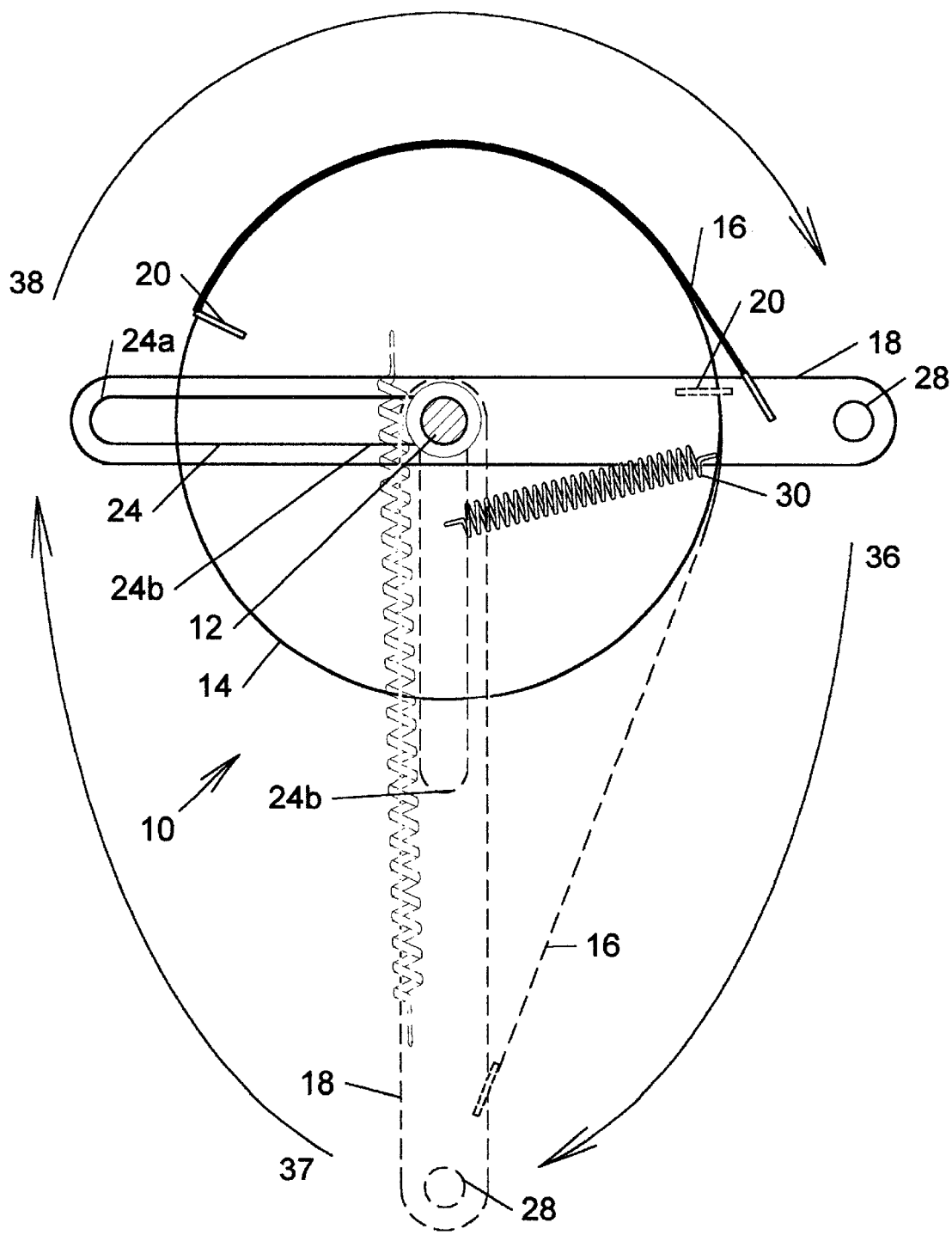
FIG. 3 is a block diagrammatic view that uses a dashed line and various arbitrarily selected positions of a threaded hole to illustrate the elliptical path taken by the threaded hole of an extensible crank.

Referring to FIG. 1 and also on occasion to FIG. 2 and FIG. 3 is shown, an extensible crank, identified in general by the reference numeral 10. A second extensible crank (not shown) is normally disposed on the opposite side of a bicycle (not shown) as is commonly known with existing prior types of cranks (not shown) so that both the right and left feet of a user (not shown) can supply motive force.

A crankshaft 12 is attached to a drive sprocket (not shown) which, in turn, supplies useful rotary power as desired. For a bicycle the drive sprocket would include a drive chain (not shown) attached thereto which supplies motive power to a driven gear (not shown). The driven gear is attached so as to urge rotation of a wheel (not shown).

A cam 14 is attached to the crankshaft 12 and therefore it rotates in synchrony with the crankshaft 12. The cam 14, as shown, is circular although the contour of the cam 14 can be modified as desired to produce alternative torque characteristics that are applied to the crankshaft 12, as is described in greater detail hereinbelow.

A chain 16 is attached at a first end 16a to the cam 14 and is attached at a second end 16b to a crank 18. A pair of flexible links 20, 22 provide a pivot, respectively at the first end 16a and the second end 16b allowing the chain 16 to pivot with respect to the cam 14 and to the crank 18.

The crank 18 includes a first crank end 18a and a second crank end 18b that is disposed at an opposite end thereof. A slot 24 is provided near the first crank end 18a having a first slot end 24a and a second slot end 24b that is disposed opposite with respect to the first slot end 24a.

The slot 24 includes a width that is greater than the diameter of the crankshaft 12 and a length that is greater than its width. The slot 24 of the crank 18 is disposed over the crankshaft 12. A retainer 26 is attached to the crankshaft 12 and is disposed in such a manner so as to retain the crank 18 in a position of cooperation about the crankshaft 12 when the crank 18 is disposed intermediate the cam 14 and the retainer 26.

A threaded hole 28 is provided in the crank 18 near the second end 18b. A pedal (not shown) is attached to the crank 18 by the screw thread attachment of a pedal shaft (not shown) to the threaded hole 28. The pedal, as is well known, is able to pivot about the pedal shaft and is adapted to receive the foot or shoe (not shown) of the user.

A spring 30 is attached to the cam 14 at a first spring end 30a and to the crank 18 at a second spring end 30b. The spring 30 supplies a biasing force which tends to urge the crank 18 into a retracted position as shown in FIG. 1. In the retracted position, the second slot end 24b is adjacent the crankshaft 12 and is useful to limit the motion of the crank 18 in a direction toward the crankshaft 12.

The extensible crank 10, as shown in FIG. 1, is in a horizontal attitude with respect to the ground surface. Any downward force applied to the pedal when the crank 18 is horizontal is used to rotate the cam 14, which in turn rotates the crankshaft 12. There is no radial force applied to the crank 18 that would tend to either extend or retract it by a purely downward force that is applied to the pedal when the crank 18 is in the horizontal orientation.

A first arrow 32 defines the direction of rotation of the extensible crank 10. A second arrow 34 defines the direction of rotation of the crankshaft 12 and the cam 14. In general, the radial force, which tends to extend the crank 18 away from the crankshaft 12, increases when the pedal shaft (i.e., the threaded hole 28) is disposed below the crankshaft 12.

This is true for a vertically seated user (not shown) but if the user were seated in more of a prone position, the radial force tending to extend the crank 18 would then increase whenever the pedal shaft is in the portion of its cycle that is disposed furthest away from the user.

A safety plate 36 is shown adjacent to the cam 14 and is useful to retain the chain 16 in position and to protect, as desired, the legs of the user. The safety plate 36 is either attached to the crankshaft 12 or not, as desired. If the safety plate 36 is attached to the crankshaft 12, it can be modified to contain gear teeth (not shown) and can, if desired, function as a modified drive sprocket (not shown).

Referring now in particular to FIG. 2, the extensible crank 10 is shown with the crank 18 disposed in a downward direction placing the threaded hole 28 as far away from the user as possible. The retainer 26 is eliminated from this particular view to better illustrate the extending of the crank 18, although the retainer 26 is still required to secure the crank 18 in position.

This position illustrates an attitude for the crank 18 when all of the downward force applied to the pedal only serves to try and extend the crank 18 further away from the crankshaft 12. In a conventional crank (not shown), this force is wasted and only serves to fatigue the user without adding any motive force.

Therefore, as the crank 18 progresses from the view in FIG. 1 to the view in FIG. 2, the radial force increases from a minimum amount to a maximum amount. Accordingly, as the radial force increases during this portion of the stroke, the crank 18 is increasingly extended away from the crankshaft 12 until, as a limit, the first slot end 24a makes contact with the crankshaft 12, as shown in FIG. 2.

The spring 30 extends in response to an extension of the crank 18. The spring 30 supplies a biasing force which serves to both retract the crank 18 during the upstroke and also which maintains tension between the crank 18 and the chain 16 by urging the crank 18 in a direction that is in general in the direction of rotation of the crankshaft 12. This prevents a slackening of the chain 16 from occurring. During the upstroke, the crank 18 is retracted by the spring 30 until the second slot end 24b is adjacent to the crankshaft 12.

As the crank 18 extends away from the crankshaft 12, the chain is simultaneously pulled by the crank 18. As the chain 18 is pulled, the cam 14 rotates in the direction of the second arrow 34 which further advances the general direction of rotation of the crankshaft 12. As such, radial force applied to the crank 18 causes an extension of the crank 18 away from the crankshaft 12. The extension of the crank 18 causes additional rotation of the crankshaft 12 to occur, thus translating radial motion into additional rotary motion.

Referring also to FIG. 3, the position of the threaded hole 28 is shown at a plurality of arbitrarily selected locations as the crank 18 rotates around the crankshaft 12. The crank 18 and other component parts of the extensible crank 10 are eliminated from this view which only shows the crankshaft 12 and various positions of the threaded hole 28 as it completes a typical cycle to better illustrate that the path traversed by the threaded hole 28 approximates an ellipse in eccentric orbit about the crankshaft 12. The size of the ellipse is determined by the length of the slot 24. A longer slot 24 will result in a longer ellipse assuming, of course, that the radial force applied is sufficient to fully extend the crank 18 away from the crankshaft 12 for a portion of the cycle and also that the crank 18 is allowed to fully retract.

The motion of the threaded hole 28, which would be the motion of the pedal shaft as well, translates an eccentric elliptical orbit around the crankshaft 12 into rotary motion by the crankshaft 12. Accordingly, the extensible crank 10 provides a method of translating eccentric elliptical motion into rotary motion.

The size attributes of any of the component parts described herein are modified to suit the particular needs. For example if more torque is required the length of the crank 18 can be increased. The length of the slot 24 can be increased or shortened, as desired. And, as mentioned above, the shape of the cam 14 can be varied to provide special torque characteristics from the extensible crank 10, as desired.

In particular, the shape of the cam 14 can be modified so as to increase or decrease the amount of rotation by the cam 14 that will occur for any given amount of extension by the crank 18. If the amount of rotation is increased the resistance to radial extension is increased as well. This is useful to maximize the transfer of radial force into additional rotary force, as desired, and can be tailored so as to take advantage of the forces that are applied during various phases of the pedaling cycle.

Accordingly, the length of the slot 24, namely the distance between the first slot end 24a and the second slot end 24b, define the stroke length of the crank 18, and therefore the stroke length of the extensible crank 10 as well. By varying the length of the slot 24 simultaneously with the shape of the cam 14, the torque characteristics of the extensible crank 10 can be infinitely varied to suit the particular application.

Figure 4:
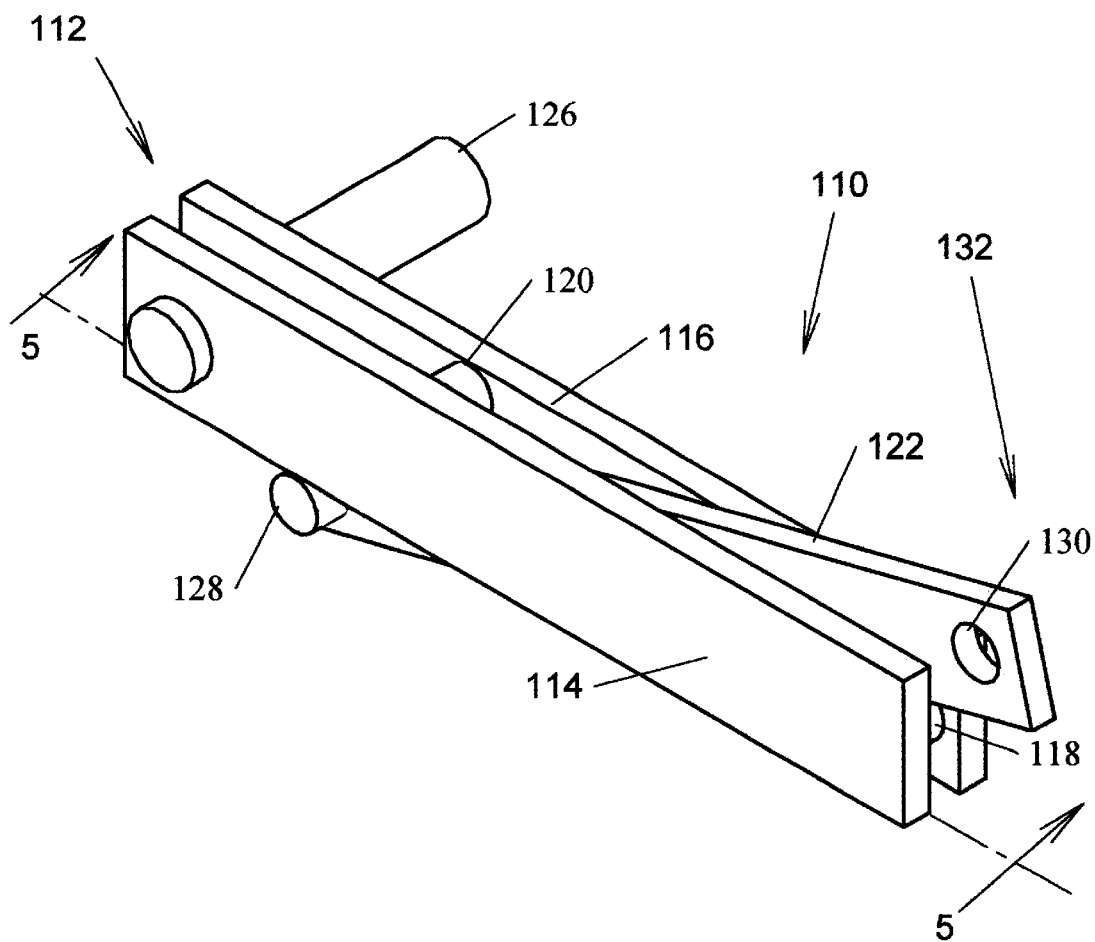
FIG. 4 is a view in perspective of an alternative embodiment of an extensible crank.
Figure 5:
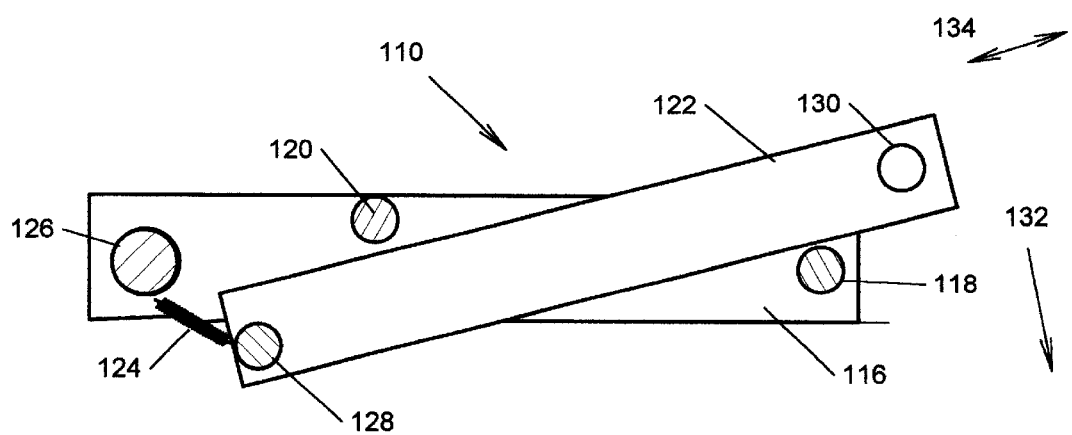
FIG. 5 is a side view of an alternative embodiment of an extensible crank taken along the line 5—5 in FIG. 4.

Referring now to FIG. 4 and FIG. 5 is shown an alternative embodiment of a modified extensible crank, identified in general by the reference numeral 110.

A primary crank, identified in general by the reference numeral 112, includes a first member 114 and a parallel second member 116 displaced adjacent thereto and separated a predetermined distance from the first member 114 by a first roller 118 and by a second roller 120, each of which are attached at each end respectively to both the first member 114 and the second member 116. The first roller 118 and the second roller 120 allow for the smooth extension and retraction of a pedal carrier arm 122 and also serve to retain the pedal carrier arm 122 in a position of cooperation intermediate the first member 114 and the second member 116. If desired, the first roller 118 or the second roller 120, are modified to permit sliding of the pedal carrier arm 122 by use of a low coefficient of friction material. In this situation, they do not have to function as a wheel nor be capable of rolling as the low coefficient of friction material is sufficient to allow extension and retraction of the pedal carrier arm 122 to occur.

A bias spring 124 that is attached at one end to the primary crank 12 and to the pedal carrier arm 122 at the remaining end thereof retracts the pedal carrier arm 122 absent a radial force applied thereto. A modified crankshaft 126 is attached to the first member 114 and to the second member 116 of the primary crank 112 and extends as desired for attachment of a modified sprocket (not shown) and a second modified extensible crank (not shown) on the opposite side of the bicycle (not shown).

A pedal carrier roller 128 is attached to the pedal carrier arm 122 and serves to retain the pedal carrier arm 122 in a position of cooperation with the primary crank 112 and also to allow for smoother extension and retraction of the pedal carrier arm 122 with respect to the primary crank 112. The above description and modifications as applied to either the first roller 118 or the second roller 120 apply also to the pedal carrier roller 128.

A modified threaded hole 130 is provided in the pedal carrier arm 122 at an end of the arm 122 that is opposite that where the pedal carrier roller 128 is attached. A third arrow 132 illustrates the direction of rotation of the modified extensible crank 110 and also of the modified crankshaft 126. A modified pedal (not shown) is attached to the modified threaded hole 130.

A radial force applied to the modified pedal is transferred through the modified threaded hole 130 to the pedal carrier arm 122. A sufficient force will overcome the force exerted by the bias spring 124 and also by the resistance of the modified crankshaft 126 and will, therefore, extend the pedal carrier arm 122 away from the modified crankshaft 126.

It is important to realize that the force that is applied to the modified pedal during the power-portion of the stroke can be represented as a vector comprised of two directional forces, a portion of which is radially attempting to extend the pedal carrier arm 122 and the remainder of which is attempting to tangentially displace the modified pedal tangentially around the modified crankshaft 126. The tangential component is sufficient to prevent the modified threaded hole 130 end of the pedal carrier arm from rising in an upward direction.

Instead, as the pedal carrier arm 122 extends further, the force exerted upon the first roller 118 increases, which causes the primary crank 112 to rotate an additional amount in the direction as shown by the third arrow 132. (This abbreviated analysis of the vector forces involves applies equally well to the first described embodiment as shown in FIGS. 1–3.)

As a result, extension by the pedal carrier arm 122 of the modified extensible crank 110 causes additional rotation of the modified crankshaft 126 than would occur were the pedal carrier arm 122 not extended. Accordingly, the modified extensible crank 110 translates an outwardly directed radial force applied to the pedal carrier arm 122 into additional rotary motion of the modified crankshaft 126.

The bias spring 124 is used to retract the pedal carrier arm 122 during the upstroke. A fourth arrow 134 (FIG. 5) illustrates the direction of extension and retraction by the pedal carrier arm 122, absent the overall rotary motion that is simultaneously being experienced by the modified extensible crank 110.

To use either the extensible crank 10 or the modified extensible crank 110, the user simply pedals in a normal fashion while periodic extensions and retractions of either the crank 18 or the pedal carrier arm 122 occur respectively without any conscious effort by the user. In use, a portion of the radial force that is applied to each of a pair of pedals (not shown) is translated into additional rotary motion of the crankshaft 12 or the modified crankshaft 126, which, in turn, further supports locomotion of the bicycle or other useful work by a device (not shown) to which the invention is operatively attached.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An extensible crank assembly for use with a crankshaft having a longitudinal axis, said crank assembly comprising a crank adapted to be operably attached to said crankshaft and to rotate in a first direction with respect to said longitudinal axis, an extending portion adapted to extend away from said crank, the entire said extending portion being radially movable with respect to said crank, means for mechanically coupling said extending portion to said crank wherein:

(i) rotation of said extending portion in said first direction causes rotation of said crank a first known amount in said first direction, and (ii) movement of said extending portion radially away from said crank causes rotation of said crank a second known amount in said first direction, and (iii) the total rotation of said crank caused by said extending portion while being rotated in said first direction and in being extended radially is the sum of said first known amount and said second known amount.

2. The extensible crank assembly of claim 1 including means for urging said extending portion toward said crank.

3. The extensible crank assembly of claim 2 wherein said means for urging includes a spring.

4. The extensible crank assembly of claim 1 including at least one cam having a predetermined size and shape attached to said crank and including means for attaching said at least one cam to said extending portion.

5. The extensible crank assembly of claim 1 wherein said means for mechanically coupling includes flexible means.

6. The extensible crank assembly of claim 5 wherein said flexible means includes a chain.

7. The extensible crank assembly of claim 5 wherein said flexible means includes at least one flexible link.

8. The extensible crank assembly of claim 1 wherein said extensible crank assembly is adapted for use with a bicycle.

9. The extensible crank assembly of claim 1 wherein said means for mechanically coupling includes at least one cam attached to said crank, said at least one cam having a predetermined size and shape and adapted to advance the rotation of said crank during extension of said extending portion.

10. The extensible crank assembly of claim 9 including means for retracting said extending portion toward said crank.

11. The extensible crank assembly of claim 10 wherein said means for retracting includes a spring.

12. The extensible crank assembly of claim 9 wherein said extensible crank assembly is adapted for use with a bicycle.

13. The extensible crank assembly of claim 1 wherein said rotation caused by said movement of said extending portion does not decrease proportionally to said movement throughout said movement.

14. An extensible crank assembly, comprising:

(a) a crankshaft and a driving member adapted to extend radially away from said crankshaft wherein all parts of said driving member move in approximately the same direction radially;

(b) a driven member, said driven member operably attached to said crankshaft and adapted to rotate said crankshaft in a first direction when said driven member is urged in said first direction; and (c) means for coupling said driving member to said driven member wherein (i) rotation of said driving member in said first direction causes rotation of said crankshaft a first known amount in said first direction; and (ii) radial extension of said driving member from said crankshaft operates upon said driven member to rotate said driven member a second known amount in said first direction providing said driving member is not permitted to rotate in a direction opposite to said first direction during said extension thereof; and (iii) rotation of said crankshaft is the sum of said first known amount and said second known amount.

15. The extensible crank assembly of claim 14 wherein said means for coupling includes at least one cam attached to said driven member.

16. The extensible crank assembly of claim 15 wherein said means for coupling includes flexible means attached to said driving member and to said at least one cam.

17. The extensible crank assembly of claim 15 wherein said means for coupling includes at least one sliding coupling adapted to permit the extension of said driving member with respect to said crankshaft.

18. An extensible crank assembly adapted for use with a bicycle comprising a crankshaft having a longitudinal axis, a crank adapted to fasten to said crankshaft, an extending portion, the entire said extending portion adapted to extend away from and retract toward said crankshaft and a remaining end of said crank adapted to fasten to said crankshaft; and means for controlling an extension of said extending portion relative to said crank such that:

(i) rotation of said extending portion in a first direction causes rotation of said crankshaft a first known amount in said first direction, and (ii) movement of said extending portion radially away from said crankshaft causes rotation of said crankshaft a second known amount in said first direction, and (iii) the total rotation of said crankshaft caused by said extending portion while being rotated in said first direction and in being extended radially is the sum of said first known amount and said second known amount.

19. The extensible crank assembly of claim 18 including means for urging retraction of said extending portion toward said crankshaft.

20. The extensible crank assembly of claim 19 wherein said means for urging retraction includes a spring operably attached to said crank.

* * * * *